UNITED STATES PATENT OFFICE.

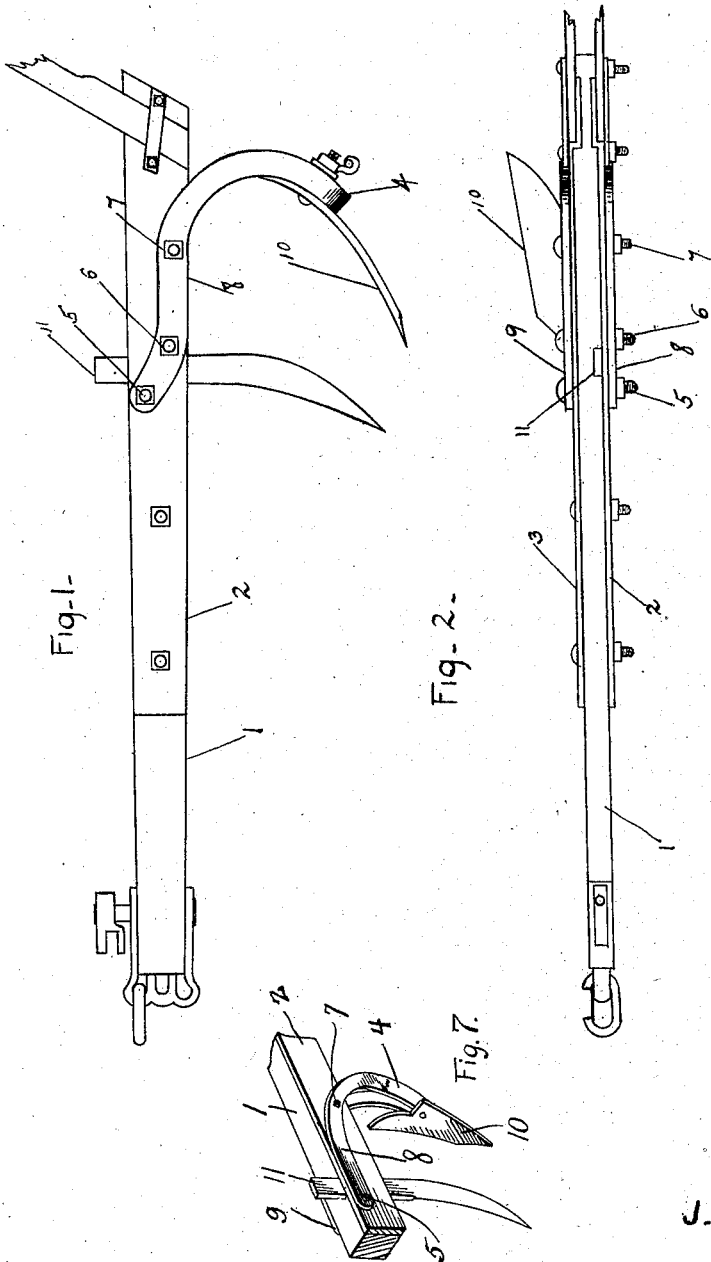

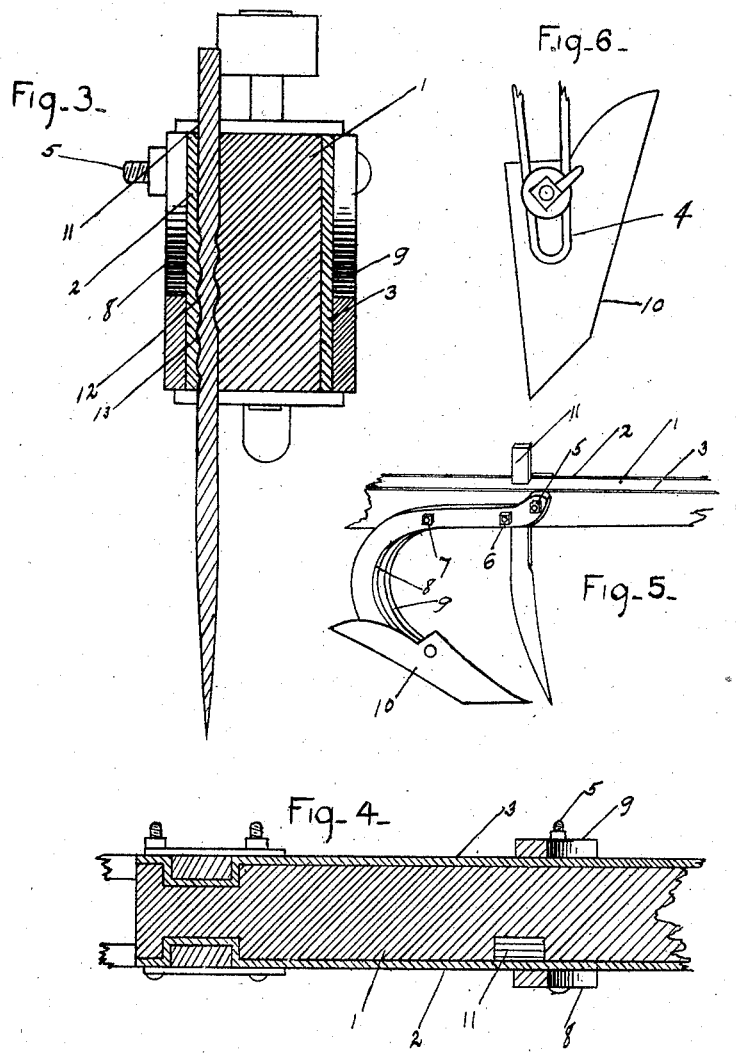

JAMES PIERCE JONES, OF FABIUS, ALABAMA.

PLOW.

963,579.  Specification of Letters Patent.  Patented July 5, 1910.

Application filed October 28, 1908. Serial No. 459,896.

*To all whom it may concern:*

Be it known that I, JAMES PIERCE JONES, a citizen of the United States, residing at Fabius, in the county of Jackson and State of Alabama, have invented a new and useful Plow; and I do hereby declare the following to be a full, clear, and exact description of the invention, such as will enable others skilled in the art to which it appertains to make and use the same.

The invention relates to the improvement in the plows and has for its object to provide a plow beam, composed of metal and wood, forming a light, durable, efficient and economical structure.

Another object of the invention is to provide a device of this character having an improved standard and means for adjusting a plow thereon.

With these and other objects in view, the invention consists in the novel construction and arrangement of parts hereinafter described and shown and particularly pointed out in the appended claim.

In the drawings, Figure 1 is a side elevation of a plow constructed in accordance with this invention. Fig. 2 is a top plan view. Fig. 3 is a vertical sectional view taken through the colter. Fig. 4 is a longitudinal sectional view taken through a portion of the beam and the side plates. Fig. 5 is a perspective view of the colter and plow. Fig. 6 is a detailed view showing the lower parts of the standard and the manner of connecting the same with the plow. Fig. 7 is a perspective view of a modified form of the invention, showing one of the longitudinal plates, and one omitted.

It will be understood that in the two horse plow, two plates will be used on the beam, but in a one horse plow only one plate will be necessary.

Referring to the drawings, 1 designates a plow-beam on each side of which is arranged a longitudinally metallic plate 2 and 3. A standard having a loop portion 4 is connected with the beam and plate by means of bolts 5, 6 and 7. The standard 4 as it approaches the beam, spreads outwardly and receives the beam between the members 8 and 9 as clearly shown in Fig. 2 of the drawing. The plow 10 is adjustably mounted on standard 4 as clearly shown in Fig. 6 of the drawing, as will be readily understood. The beam 1 is provided with a rectangular recess for the reception of the shank 11 of a colter. The shank 11 is provided with corrugations 12 which engage serrations 13 formed in the plate 8. These corrugations are for the purpose of enabling the colter to be vertically adjusted as desired. The bolts 5 and 6 hold the beam plates, and colter all in rigid position. The ends 8 and 9 of the standard having the bolts 5 and 6, are designed to partially relieve the strain on the beam caused by the colter, as will be readily understood. The handles are secured to the beam by means of staples, the use of which will prevent the handles from splitting.

It will be seen that the arrangement of the upper portion of the standard, is an essential part of this invention and that by this arrangement, the standard coöperates with the longitudinal plates on the beam in reducing the strain on said beam. Therefore this particular form of standard, or a similar standard is a necessary and integral part of the combination of elements.

What is claimed is:

In combination, a supporting beam provided with a recess on one side thereof, a colter having its upper end disposed in the recess, reinforcing plates secured to the opposite sides of the frame, a standard comprising a single piece of metal bent upon itself, to form opposing arms, and forwardly curved at its lower end, the upper end of the standard being disposed in an opposite curve and the opposing curves of the standard being placed against the reinforcing plates, bolts extending through the upper end of the standard, and through the reinforcing plates and the beam on opposite sides of the recess adapted to clamp the colter therein, and secure the standard to the beam, and a plow share secured to the lower end of the standard.

In testimony whereof I have signed my name to this specification in the presence of two subscribing witnesses.

JAMES PIERCE JONES.

Witnesses:
M. N. JONES,
S. Z. HOGUE.